S. A. HAMILTON.
EGG CRATE.
APPLICATION FILED JULY 24, 1908.
908,663.
Patented Jan. 5, 1909.
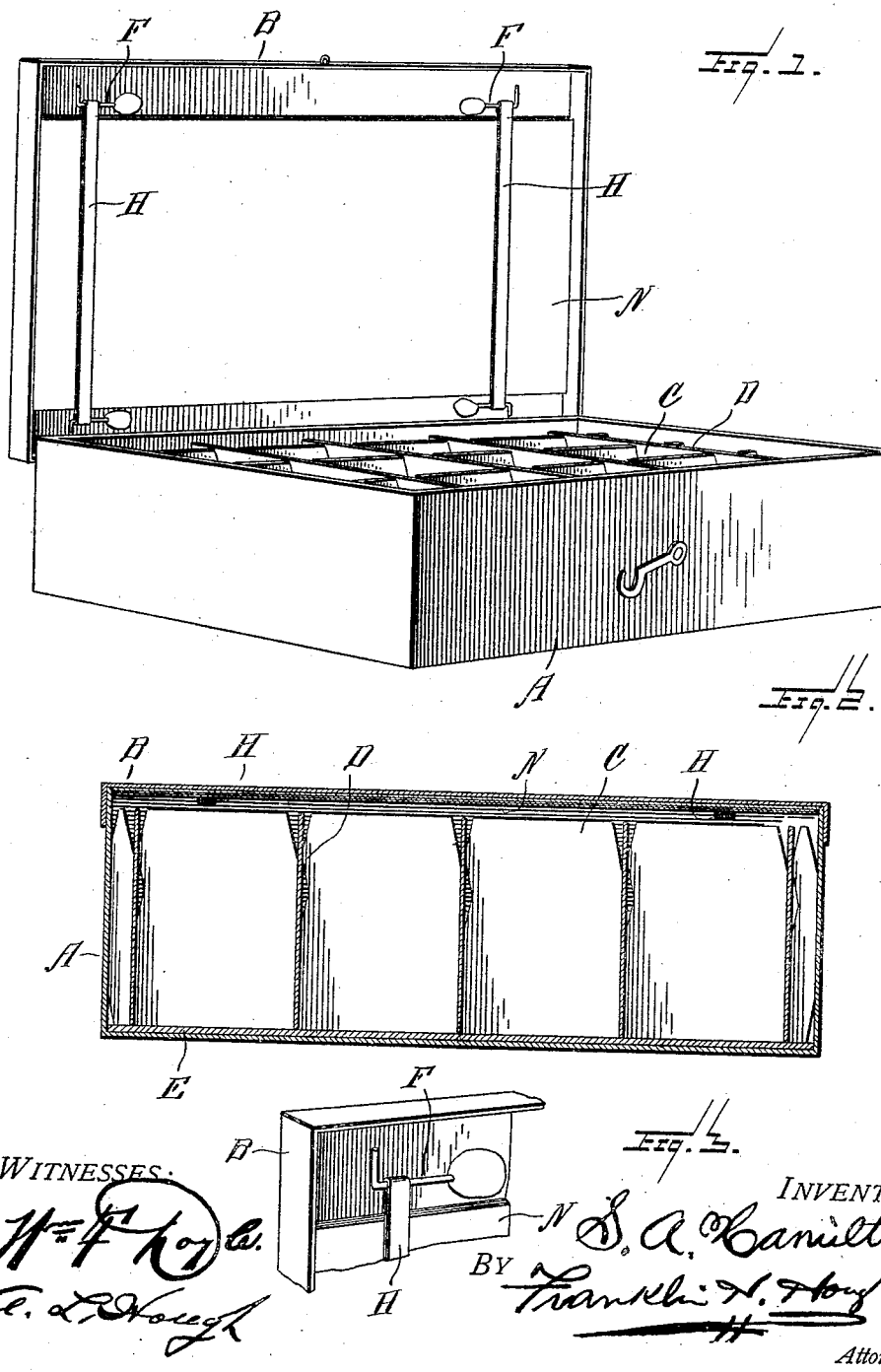
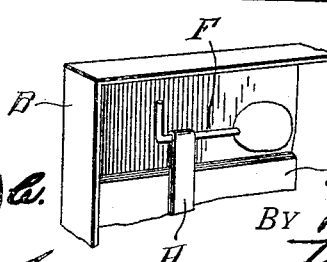

UNITED STATES PATENT OFFICE.

SIDNEY A. HAMILTON, OF SCHENECTADY, NEW YORK.

EGG-CRATE.

No. 908,663.  Specification of Letters Patent.  Patented Jan. 5, 1909.

Application filed July 24, 1908. Serial No. 445,204.

*To all whom it may concern:*

Be it known that I, SIDNEY A. HAMILTON, a citizen of the United States, residing at Schenectady, in the county of Schenectady and State of New York, have invented certain new and useful Improvements in Egg-Crates; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in egg crates and the object in view is to produce a simple and efficient device of this nature which may be used for delivering eggs and affording means whereby eggs may be delivered without danger of breaking.

The invention comprises various details of construction, combinations and arrangements of parts which will be hereinafter fully described and then specifically defined in the appended claim.

I illustrate my invention in the accompanying drawings, in which:—

Figure 1 is a perspective view showing a crate open. Fig. 2 is a longitudinal sectional view through the box with cover closed. Fig. 3 is an enlarged detail view of a portion of the inside of the cover showing the manner of holding sacks thereon.

Reference now being had to the details of the drawings by letter, A designates a box having a flanged cover B hinged thereto and adapted to fit over the top of a box and form a secure closure therefor, such as will withstand pressure coming upon the same and afford means for protecting the contents of the box. Within the box are the cells C formed by the intersecting partitions D, and E is a felt lining for the bottom of the box. Upon the under side of the flanged cover of the box and fixed thereto are the hooks F having resilient shank portions extending longitudinally with the cover and spaced apart therefrom, said hooks being fastened at corresponding ends in such a manner that the shank portions thereof will be parallel with the cover and held adjacent thereto. Said hooks are arranged in pairs and their free ends outwardly turned, and H—H designate rubber bands which are held upon said hooks in the manner shown and afford means under which paper bags N are held. Said bags serve as a cushion for the upper parts of the cells in which the eggs are located and coöperate with the felt under the partitions to hold the eggs securely from shaking around and becoming broken when being delivered.

When the eggs are delivered, they may be removed from the box and placed in one of the bags allowing the return of the box after the eggs are delivered.

By the provision of an egg delivering box as shown, it will be understood that it will not be necessary for the deliverer to leave the crate but, having transported the same safely in the crate, may remove the same and take back the crate for refilling.

What I claim to be new is:—

In combination with a box having a flanged cover, hooks fixed to the under surface of the cover and having shank portions extending longitudinally with the cover and spaced apart therefrom and resilient, each hook having a free right angled end extending in opposite directions, and bands passing over the shank portions of hooks arranged in pairs adjacent to each end of the cover, as shown and described.

In testimony whereof I hereunto affix my signature in the presence of two witnesses.

SIDNEY A. HAMILTON.

Witnesses:
J. E. VAN EPS,
H. W. DENNINGTON.